United States Patent
Garson et al.

(10) Patent No.: US 8,380,347 B2
(45) Date of Patent: Feb. 19, 2013

(54) METHOD AND APPARATUS FOR USE IN A VENDING MACHINE

(76) Inventors: Brent D. Garson, Orange, OH (US); Aviel Dafna, Moreland Hills, OH (US); Alessandro Ratti, Via Varesina (IT); Ezio Cesare Ratti, Via Manzoni (IT)

(*) Notice: Subject to any disclaimer, the term of this patent is extended or adjusted under 35 U.S.C. 154(b) by 713 days.

(21) Appl. No.: 12/250,269

(22) Filed: Oct. 13, 2008

(65) Prior Publication Data
US 2010/0094457 A1 Apr. 15, 2010

(51) Int. Cl.
*G06F 17/00* (2006.01)
(52) U.S. Cl. ........ 700/244; 700/236; 700/242; 700/243; 700/238; 700/240
(58) Field of Classification Search ........... 700/240, 700/236, 238, 242–244
See application file for complete search history.

(56) References Cited

U.S. PATENT DOCUMENTS

| | | | |
|---|---|---|---|
| 5,207,784 A | 5/1993 | Schwartzendruber | |
| 5,390,711 A | 2/1995 | Murphey | |
| 5,941,363 A | 8/1999 | Partyka et al. | |
| 6,131,399 A | 10/2000 | Hall | |
| 6,330,856 B1 * | 12/2001 | Fitzgerald et al. | 100/52 |
| 6,535,637 B1 | 3/2003 | Wootton et al. | |
| 6,711,293 B1 | 3/2004 | Lowe | |
| 6,748,296 B2 * | 6/2004 | Banerjee et al. | 700/241 |
| 6,920,372 B2 | 7/2005 | Nickerson et al. | |
| 7,020,680 B2 | 3/2006 | Defossé | |
| 7,086,560 B2 * | 8/2006 | Shioya | 221/191 |
| 7,139,639 B2 | 11/2006 | Broussard et al. | |
| 7,191,034 B2 | 3/2007 | Whitten et al. | |
| 7,246,745 B2 | 7/2007 | Hudnut et al. | |
| 7,286,901 B2 | 10/2007 | Whitten et al. | |
| 7,343,220 B2 | 3/2008 | Hair, III et al. | |
| 7,412,427 B2 | 8/2008 | Zitnick et al. | |
| 7,570,786 B2 * | 8/2009 | Ateya | 382/103 |
| 7,584,868 B2 | 9/2009 | Bauch et al. | |
| 7,787,988 B2 * | 8/2010 | Whitten et al. | 700/244 |
| 7,930,064 B2 | 4/2011 | Popovich et al. | |
| 8,041,453 B2 * | 10/2011 | Walker et al. | 700/238 |
| 8,065,035 B2 * | 11/2011 | Ross et al. | 700/224 |
| 8,145,351 B2 * | 3/2012 | Schininger et al. | 700/237 |
| 2002/0038167 A1 * | 3/2002 | Chirnomas | 700/231 |

(Continued)

FOREIGN PATENT DOCUMENTS
GB 2 414 473 A 11/2005
WO WO 2006/036153 A 4/2006

(Continued)

*Primary Examiner* — Michael K Collins
(74) *Attorney, Agent, or Firm* — Tarolli, Sundheim, Covell & Tummino LLP

(57) ABSTRACT

During operation of a vending machine, visual images of the next product to be dispensed from product dispensing locations are obtained. Features of the visual images are compared to a data base of features to determine the identity of the next product to be dispensed from each of the dispensing locations. After a product has been dispensed from a dispensing location, a visual image is obtained of the next product at the dispensing location. Features of the visual image of the next product at the dispensing location are compared to a data base of features to determine the identity of the next product to be dispensed. A displayed price of a product is compared with product prices in the data base. If necessary, the displayed price is adjusted to agree with the data base.

23 Claims, 4 Drawing Sheets

U.S. PATENT DOCUMENTS

| | | |
|---|---|---|
| 2004/0103033 A1 | 5/2004 | Reade et al. |
| 2005/0143857 A1* | 6/2005 | Chirnomas .................. 700/244 |
| 2005/0156028 A1* | 7/2005 | Chirnomas .................. 235/381 |
| 2005/0216120 A1* | 9/2005 | Rosenberg et al. ........... 700/244 |
| 2006/0102645 A1* | 5/2006 | Walker et al. .................. 221/75 |
| 2006/0287925 A1 | 12/2006 | Taylor et al. |
| 2007/0043469 A1* | 2/2007 | Draper .......................... 700/231 |
| 2008/0033596 A1* | 2/2008 | Fausak et al. ................ 700/244 |
| 2008/0249658 A1* | 10/2008 | Walker et al. ................ 700/236 |
| 2009/0089187 A1* | 4/2009 | Hoersten et al. ............... 705/28 |
| 2009/0306817 A1* | 12/2009 | Antao et al. .................. 700/231 |
| 2009/0306818 A1* | 12/2009 | Slagley et al. ................ 700/232 |

FOREIGN PATENT DOCUMENTS

| | | |
|---|---|---|
| WO | WO 2008/022228 A | 2/2008 |

* cited by examiner

METHOD AND APPARATUS FOR USE IN A VENDING MACHINE

BACKGROUND OF THE INVENTION

The present invention relates to a new and improved method and apparatus for use in a vending machine which dispenses products to customers.

Vending machines have been utilized to provide various snacks, beverages and other products to customers. The vending machines dispense selected products to customers in response to insertion of money, which may be paper and/or coins, into the machines. Known vending machines may be similar to vending machines disclosed in U.S. Pat. Nos. 5,303,844 and 6,732,014.

These known vending machines are periodically stocked with products which are to be dispensed to customers. During stocking, the products are positioned in dispensing devices. Each of the dispensing devices holds a plurality of products which are sequentially moved from storage locations to a dispensing location. Customer readable indicia indicates the location of the product associated with each of the dispensing devices.

When a customer has selected a product, the customer inserts money or a credit card into the known machine. In addition, the customer actuates a selection switch panel to indicate the location of the product which has been selected. When this has occurred, a dispensing device for the selected product is operated and the selected product moves from a dispensing location to a product retrieval location. The customer manually retrieves the product at the product retrieval location.

Known dispensing devices have included one or more helical conveyors. These conveyors have sequentially moved products from storage locations to dispensing locations. Other dispensing devices have utilized other types of conveyors, for example, dividers or pusher members may be connected with a conveyor belt or chain and moved with the belt or chain to sequentially move products from storage locations to a dispensing location. Other known dispensing devices use gravity feed of products.

After a vending machine has been in operation for a period of time, it is necessary to restock the vending machine with products to be sold. When this is to be done, a supply of each of the products for a vending machine is transported to the vending machine. The dispensing devices are then stocked with new products or with products which correspond to products which were previously sold. In restocking the vending machine, products which sell for the same price and which are identical to other products in a dispensing device are positioned in the dispensing device.

SUMMARY OF THE INVENTION

The present invention provides a vending machine having a plurality of product dispensing devices. Each of the product dispensing devices holds a next product to be dispensed from the dispensing device and a plurality of products which are located at product storage locations in the product dispensing device. The products at the storage locations are sequentially moved to the product dispensing location.

In accordance with one of the features of the present invention, a visual image of the next product to be dispensed at the product dispensing location in each of the product dispensing devices is obtained. Features of the visual image of the next product to be dispensed from each of the product dispensing locations are compared to a data base of features to determine the identity of the next product to be dispensed from each of the dispensing devices. Thereafter, the next product to be dispensed is moved from one of the dispensing devices to a product retrieval location for a customer who selected the product.

When a first product is moved from a dispensing location in one of the product dispensing devices, a second product is moved from a storage location to the dispensing location. In accordance with another feature of the present invention, a visual image is obtained of the second product at the dispensing location in the one product dispensing device. Features of the visual image of the second product are compared to a data base of features to determine the identity of the second product.

In accordance with another feature of the present invention, prices of products at the dispensing locations are determined by comparing features of visual images of the products to the data base of features. Once the identity of the product has been determined, prices on displays associated with the products are brought into agreement with the products at the dispensing locations. Any disagreement between the displayed price and the price as determined by the data base is corrected.

In accordance with another feature of the present invention, data representative of the identity of the products dispensed from the vending machine is transmitted to a location which is spaced from a vending machine. A group of products, corresponding to products which the transmitted data indicates were dispensed from the vending machine, is formed. This group of products is transported to the vending machine to facilitate restocking of the vending machine. In addition, the data which is transmitted from the vending machine indicates the amount of money which was deposited in the vending machine to facilitate the accounting for the money.

The present invention has a number of different features. These features may be utilized together as disclosed herein. These features may be utilized separately and/or in various combinations with each other or the prior art.

BRIEF DESCRIPTION OF THE DRAWINGS

The foregoing and other features of the present invention will become more apparent upon a consideration of the following description taken in connection with the accompanying drawings wherein.

DESCRIPTION OF SPECIFIC EMBODIMENTS OF THE INVENTION

General Description

Figure 1:
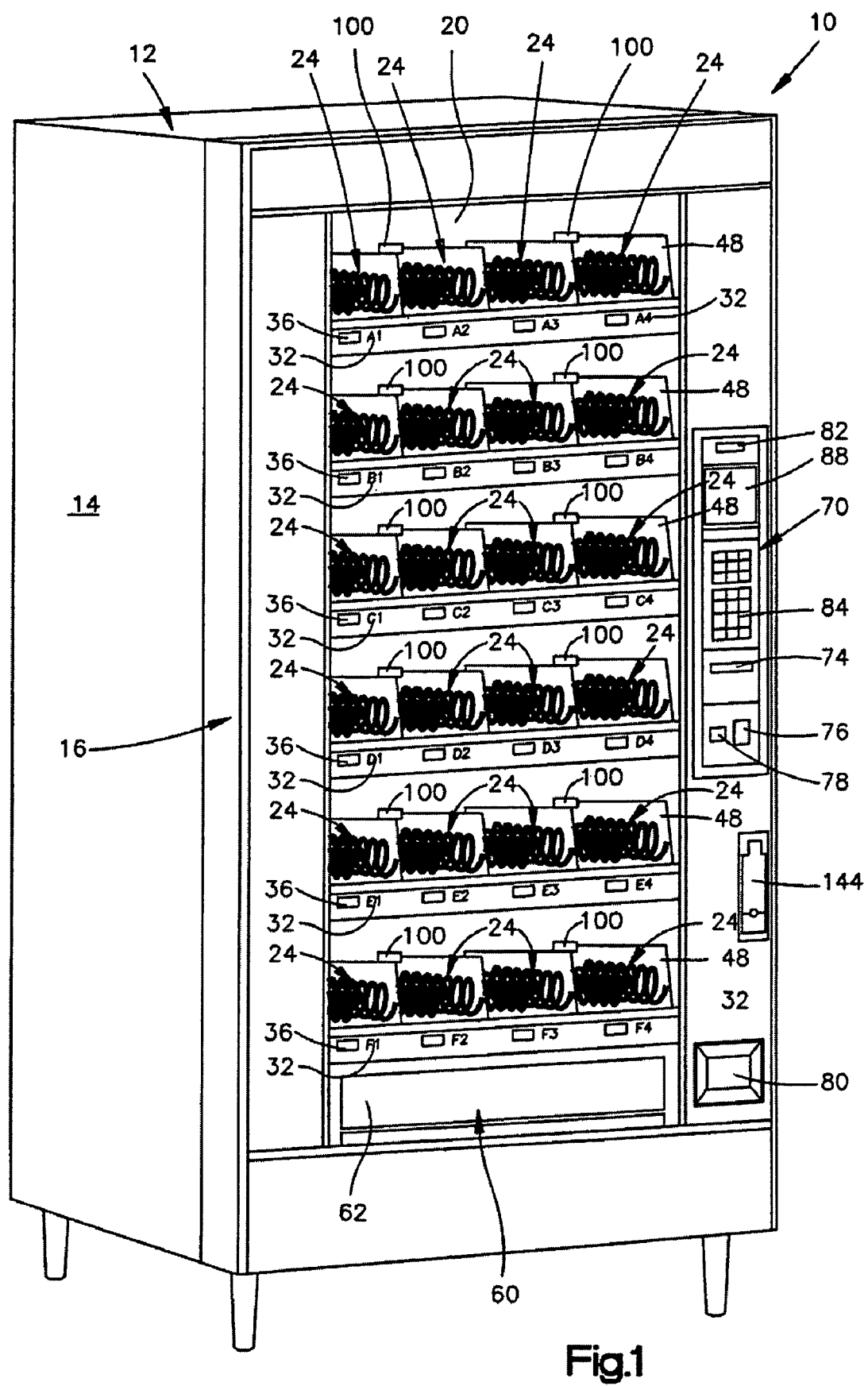
FIG. 1 is a schematic illustration of a vending machine which is constructed and operated in accordance with the present invention.

A vending machine 10 (FIG. 1) is constructed and operated in accordance with the present invention. The vending machine 10 includes a rectangular housing 12 having side walls 14 and a door 16. The door 16 has a transparent window or panel 20. The door 16 is pivotally mounted on hinges (not shown) connected to the side walls 14 in a known manner.

Figure 2:
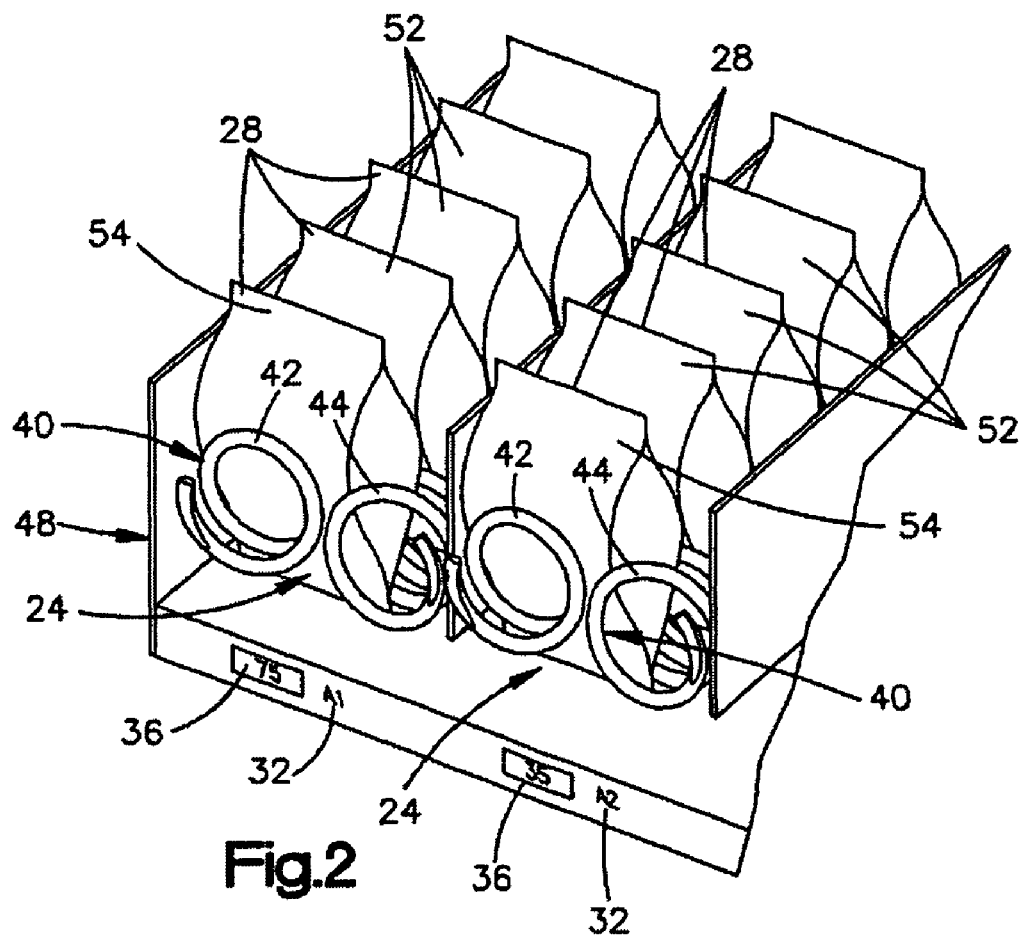
FIG. 2 is an enlarged fragmentary schematic illustration depicting the manner in which products are held by dispensing devices in the vending machine of FIG. 1.

Disposed within the housing 12 are a plurality of product dispensing devices 24. The product dispensing devices 24 are visible through the glass window 20 in the door 16. In FIG. 1, the product dispensing devices 24 are all shown as being empty, that is, before the product dispensing devices are stocked with products 28 (FIG. 2). It should be understood that the product dispensing devices may have any desired construction and be used to dispense any desired product. It should also be understood that the door 16 may not have a transparent window through which the product dispensing devices 24 are visible.

The location of the product dispensing devices 24 in the vending machine 10 is indicated by indicia 32 (FIGS. 1 and 2). The indicia 32 is associated with each of the dispensing devices 24. The indicia 32 indicates the location of the dispensing devices 24 in the machine 10.

In the illustrated embodiment of the invention, the indicia 32 is of the alpha numeric type. The indicia 32 includes a letter which designates the row in which a dispensing device is found in the vending machine 10. Thus, the rows are designated A, B, C, D, E, and F. The numerals in the indicia 32 indicate the position of the dispensing devices 24 in the particular row. Thus, A1 indicates the first product dispensing device 24 in the upper row of product dispensing devices. The indicia 32 may include two numbers instead of a letter and a number. Alternatively, the indicia 32 may include two letters instead of a letter and a number.

In addition to the indicia 32, an electronically changeable price display 36 (FIG. 2) is provided in association with each of the dispensing devices 24. The price display 36 indicates the price of the next product 28 to be dispensed by the dispensing device. The indicia 32 and the price display 36 are clearly visible to a potential customer through the transparent window 20 in the door 16.

If desired, the vending machine 10 may have a door which blocks a potential customer's view of the dispensing devices 24. If this is done, the price display 36 would be visible on the front of the vending machine along with indicia identifying the products with which the prices are associated.

Each of the dispensing devices 24 includes a conveyor assembly 40 (FIG. 2) which engages the products 28. Each of the conveyor assemblies 40 has a known construction. Each of the illustrated conveyor assemblies 40 includes a pair of helical conveyor elements 42 and 44 which engage the products 28. The helical conveyor elements 42 and 44 are rotatable about their parallel longitudinal central axes relative to a tray 48 on which the products 28 are disposed. The helical conveyor elements 42 and 44 may be referred to as "spirals". If desired, a conveyor assembly 40 may include only single conveyor element 42 or 44.

When a product 28 is to be dispensed from a product dispensing location 54 and a next succeeding product is to be advanced from a storage location 52 (FIG. 2) to the product dispensing location, the helical conveyor elements 42 and 44 are rotated in opposite directions about their longitudinal central axes. Thus, the conveyor element 42 is rotated in a counterclockwise direction (as viewed in FIG. 2) about its longitudinal central axis while the conveyor element 44 is rotated in a clockwise direction about its longitudinal axis.

This rotation of the two conveyor elements 42 and 44 is effective to move the product 28 at the dispensing location 54 off of the tray 48 so that the product drops downward between the trays 48 and the window 20 in the door 16 (FIG. 1). The dispensed product 28 drops onto a shelf (not shown) at a product retrieval location 60 (FIG. 1) in the vending machine 10. The customer then manually pivots a delivery door 62 to gain access to the product on the shelf. At the same time, the conveyor elements 42 and 44 move a next succeeding product 28 from a product storage location 52 to the product dispensing location 54 (FIG. 2). If desired, a product retrieval location 60 having a different construction may be utilized.

Although the illustrated conveyor assemblies 40 utilize helical conveyor elements 42 and 44 to sequentially move products 28 forward from storage locations 52 toward the product dispensing location 54, one or more of the conveyor assemblies 40 may include only a single helix. A different type of conveyor assembly may be utilized if desired. For example, indexing or pusher elements may be connected with a continuous belt or chain conveyor and utilized to push the products 28 to the dispensing location 54 and then to push each product in turn from the dispensing location. Alternatively, a circular disc may be intermittently rotated to move products 28 to a dispensing location. The disc may be rotated to dispense a product from the dispensing location. As another example, a gravity feed conveyor may be utilized.

The products 28 have been illustrated in FIG. 2 as being bags which hold the product being dispensed, for example, potato chips or popcorn. However, the product 28 may be different from the illustrated product. For example, the product may be containers (bottles and/or cans) of liquid, candy bars, video tapes, or compact discs. It should be understood that any one of many different types of known conveyor assemblies may be utilized in place of the conveyor assembly 40 to dispense many different known products in place of the illustrated products 28.

A control panel 70 (FIG. 1) is mounted on the door 16 of the vending machine 10. The control panel 70 includes various items with which a customer interacts to purchase one or more products being sold by the vending machine 10. The control panel 70 includes a bill validator insert 74 where paper money may be inserted into the vending machine 10. In addition, the control panel 70 includes a coin insert 76 where coins may be inserted into the vending machine 10. If used, a coin scavenger button 78 is manually actuatable to have coins returned at a coin return 80. Rather than depositing money, a credit/debit card may be used to pay for a purchase. A credit display window 82 indicates the amount of money which has been deposited or charged.

A selector switch keyboard 84 is manually actuatable to enable a product letter and number, corresponding to the indicia 32 associated with the products, to be entered. When the indicia corresponding with a desired product is entered at the keyboard 84, a product dispensing device 24 for the selected product is activated to move the selected product 28 from the dispensing location 54. Operation of the selected product dispensing device is also effective to move a next succeeding product 28 to the product dispensing location 54.

As the selected product moves from the product dispensing location, it falls downward to the product retrieval location 60. If the customer is entitled to change from the money which was inserted into the machine, the change is returned at the coin return 80. It should be understood that the selected product 28 may reach the product retrieval location 60 in ways other than falling. For example, the product could be scooped up or set on a shelf. If desired various elevators or X/Y delivery systems may be used.

In addition, the control panel 70 includes a display 88 where indicia relative to a selected product 28 may be displayed. This indicia may indicate the characteristics of the selected product, such as the number of calories, ingredients and/or food value. If desired the display 88 may be omitted.

The illustrated vending machine 10 has the same general construction and mode of operation as a Model 148 which is commercially available from Crane-National Vendors having a place of business at 12955 Enterprise Way, Bridgeton, Mo. 63044. However, it should be understood that the vending machine 10 may have a different construction. The features of the invention are not to be considered as being limited to vending machines made by Crane-National Vendors or to any specific type of vending machine.

Product Imaging

In accordance with one of the features of the present invention, a plurality of imaging devices 100 are provided to obtain visual images of the next products 28 to be dispensed. The next products 28 to be dispensed are the products at the dispensing locations 54 (FIG. 2) in each of the dispensing devices 24.

Figure 3:
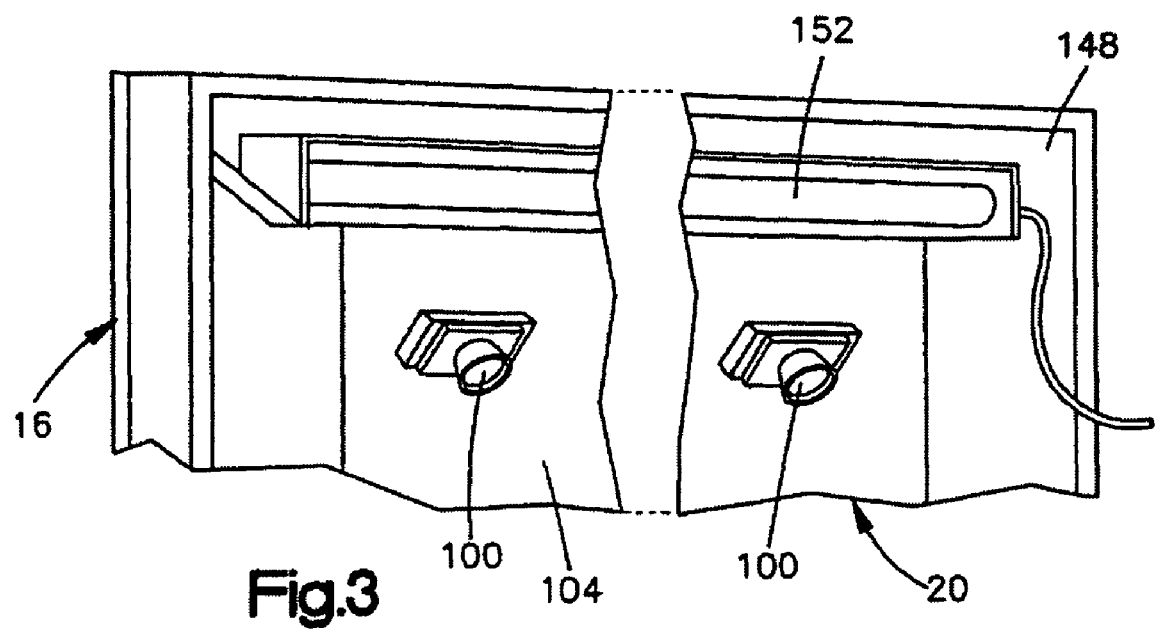
FIG. 3 is an enlarged fragmentary schematic illustration depicting the manner in which imaging devices are mounted in the vending machine of FIG. 1.

In the illustrated embodiment of the invention, the imaging devices 100 are disposed on an inner side surface 106 of the window 20 (FIGS. 1 and 3). The window mounted imaging devices 100 face inward toward the product dispensing devices 24. It should be understood that the imaging devices 100 may be positioned at locations other than on the transparent panel of the window 20. For example, the imaging devices 100 may be mounted on the housing 12 and/or frame of the door 16.

In the illustrated embodiment of the vending machine 10, the door 16 has a transparent window 20 on which the imaging devices are mounted. However, the door 16 may be opaque. If this is the case, the imaging devices 100 may be mounted on an opaque panel on the inside of the door 16.

In the illustrated embodiment of the invention, the imaging devices 100 are color digital camera modules. The imaging devices 100 convert a visual image, which may be referred to as an optical image, to an electrical signal. The specific imaging devices 100 illustrated in FIG. 3 are color digital cameras which are commercially available from STMicroelectronics having places of business at 1000 E. Bell Road, Phoenix, Ariz. 85022, USA and at 39, Chemin du Champ des Filles, C.P. 21, CH 1228 Plan-Les-Ouates, Geneva, SWITZERLAND and is commercially available under the designation of ST VL6624/VS6624. It should be understood that imaging devices other than this specific imaging device may be utilized if desired. Thus, any imaging device which converts a visual (optical) signal to an electrical signal may be utilized.

Controls 106 (FIG. 4) are connected with the product dispensing devices 24, imaging devices 100, and control panel 70. The controls 106 effect operation of each of the imaging devices 100 to obtain initial images of all the products 28 (FIG. 2) disposed at the dispensing locations 54 each time the vending machine 10 is stocked with products 28. Thus, a visual image of each of the products at the dispensing locations 54 in all of the product dispensing devices 24 in the vending machine 10 is obtained by activating each of the imaging devices 100 upon completion of stocking of the vending machine 10. The controls 106 are disposed in the housing 12.

Thereafter, only an imaging device 100 associated with a product location indicated by the indicia 32 (FIG. 2) of a product dispensed from the vending machine 10 is activated. Thus, after a product 28 has been dispensed from a product dispensing device 24 and a next succeeding product has been moved to the product dispensing location 54, only one imaging device 100 (FIGS. 1, 3 and 4) is activated to obtain a visual image of the product 28 which was just moved from a storage location 52 to a product dispensing location 54 (FIG. 2). If desired, more than one imaging device 100 may be activated to obtain more than one image of the product 28 which was just moved to a product dispensing location.

After the vending machine 10 has been stocked, all of the imaging devices 100 are activated to obtain images of all of the products 28 at all of the product dispensing locations 54. Thereafter, each time a product 28 is dispensed from a product dispensing location 54 and a next succeeding product has been moved from a storage location 52 to a dispensing location, only one of the imaging devices 100 is activated to obtain an image of the next succeeding product 28 which was moved to a product dispensing location 54. As was previously mentioned, more than one imaging device 100 may be activated to obtain images of the next succeeding product 28 which is moved to a product dispensing location 54.

When a product 28 (FIG. 2) is dispensed from the product dispensing location 54, the product drops downward (as viewed in FIG. 1) between the window 20 and the trays 48 (FIG. 2) of product dispensing devices 24. As the product 28 moves downward to the product retrieval location 60, an imaging device 110 (FIG. 4) is activated to obtain an image of the product while it is dropping and/or while it is at the retrieval location 60. The imaging device 110 is a color digital camera and has the same construction as the imaging devices 100. As was previously mentioned, the product 28 may be moved to the retrieval location in a manner other than by falling downward.

Rather than using an imaging device 110 to detect dispensing of a product 28, a different product detection system may be utilized to detect dispensing of a product. For example, a product drop detection system similar to the system disclosed in U.S. Pat. No. 6,920,372 may be utilized. Of course other known product drop detection systems may be utilized if desired, such as Is VendWizard™ available from Vendor Exchange International, Inc. in Cleveland, Ohio.

Figure 4:
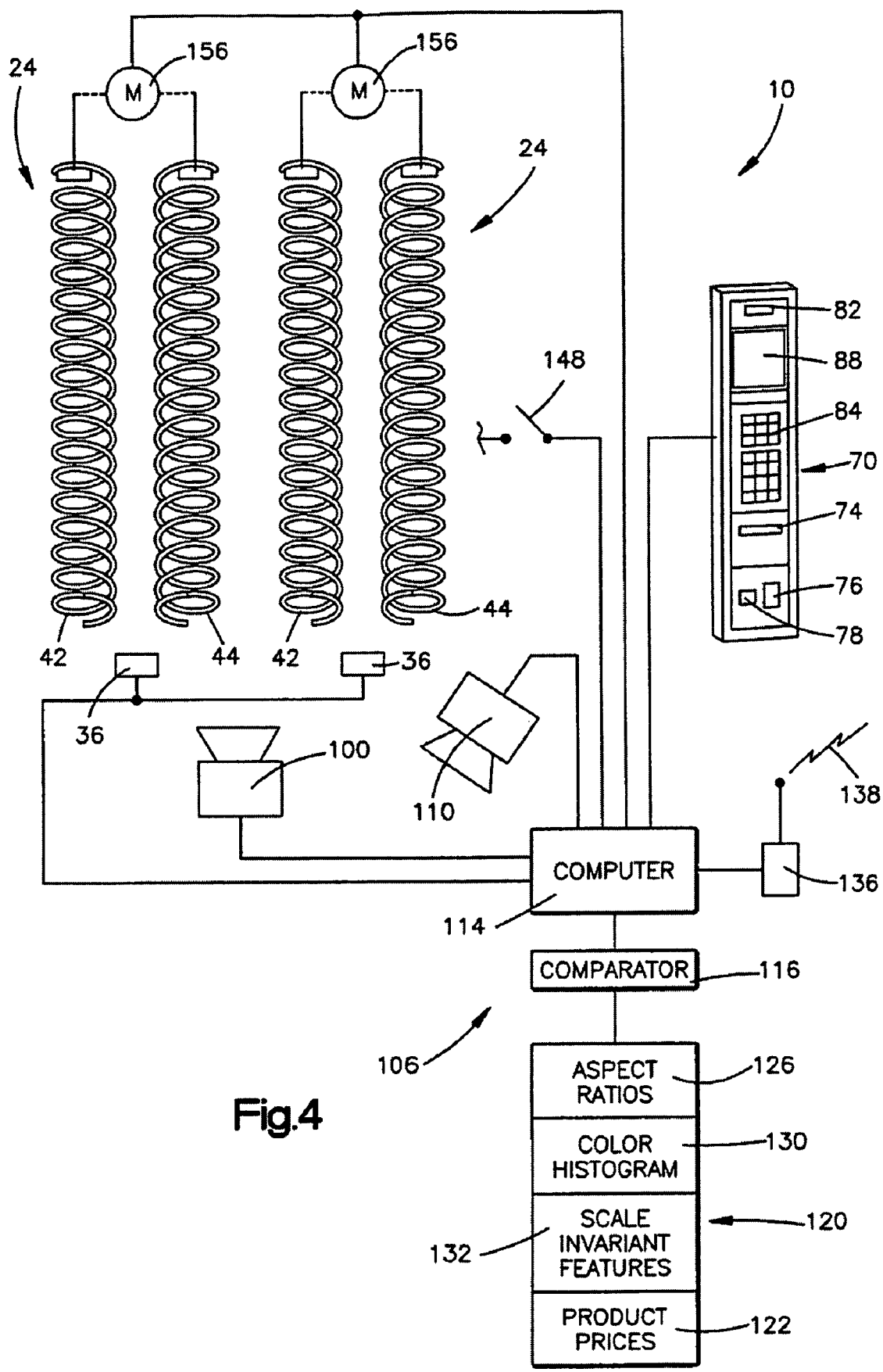
FIG. 4 is a schematic illustration of controls for the vending machine of FIG. 1.

Although only a single imaging device 110 for obtaining an image of a product 28 at the product retrieval location 60 is illustrated in FIG. 4, it should be understood that a plurality of imaging devices 110 may be provided in the vending machine 10. For example, an imaging device 110 may be mounted on the right side of the housing 12 (FIG. 1) and a second imaging device 110 may be mounted on the left side of the housing to obtain views of the product retrieval location 60 and a dispensed product from different locations. If desired, the imaging devices 110 for imaging the product as it drops and/or is at the retrieval location 60 may be mounted on the window 20 of the door 16 rather than the housing 12.

The imaging devices 100 and 110 convert an optical image of a product 28 to an electrical signal which is representative of the image. The electrical signals corresponding to images of product 28 are transmitted from the imaging devices 100 and 110 to a computer 114 (FIG. 4) in the controls 106. A comparator 116 compares features of the images represented by the electrical signals transmitted from the imaging devices 100 and 110 to a data base 120 of features. By comparing the electrical signals representative of the visual (optical) images obtained with the imaging devices 100 and 110 to the data base 120, the identity of a product 28 corresponding to a visual image obtained by an imaging device can be determined.

The data base 120 includes a product price data base 122. Once the identity of a product 28 has been determined, the price of the product can be determined from the product price data base 122. The computer 114 compares the price of a product 28, as determined by the data base 120, with the price set forth at the display 36 associated with the product. If the price set forth at the display 36 is different than the product price, as determined by the data base 120, the computer 114 changes the display to agree with the price determined by the data base.

If desired, once the identity of a product has been determined, the computer can reset the price at the display 36 without comparing the price of the product to the displayed price. This would result in the display 36 being reset automatically each time the identity of a product is determined. When the display is reset, the displayed price may or may not change.

The display 36 may include liquid crystal display components or light emitting diode components. The display is electrically energized to set forth the correct price of the product at the dispensing location 54 associated with the display. The display 36 may be energized by the computer 114 to set forth the price of a product, in a known manner, with seven segment numerals. It should be understood that the display 36 may have any desired construction so long as the computer 114 can effect a change in the price set forth at the display.

As was previously mentioned, the display 36 may be disposed on the outside of the vending machine 10. If this is done the door 16 may be constructed so as to block a customer's view of the dispensing devices 24. The imaging devices 100 would be disposed inside the vending machine 10 and would not be visible to a customer.

When a product 28 is dispensed from the dispensing location 54 (FIG. 2), a next succeeding product is moved from a storage location 52 to the dispensing location. Thereafter, at least one of the imaging devices 100 (FIGS. 1 and 4) is activated to obtain a visual image of the next succeeding product 28 which is moved to the product dispensing location 54. If desired, a plurality of imaging devices 100 may be activated to obtain a plurality of images of the next succeeding product 28. The computer 114 (FIG. 4) effects operation of the comparator 116 to compare the image or images of the next succeeding product to the data base 120. This enables the identity of the next succeeding product to be determined.

Once the identity of the next succeeding product moved to a dispensing location 54 has been determined, the price of the product can also be determined from the product price data base 122. The computer 114 compares the price indicated by the price display 36 with the price of the next succeeding product as determined by the data base 120 and visual image of the product. If the price indicated by the price display 36 is different than the price determined from the product price data base 122, the price indicated by the price display 36 is changed to indicate the correct price for the product which is moved from the storage location to the dispensing location 54. This enables products having different prices to be sequentially dispensed from the same dispensing location 54 while indicating the correct price for the particular product which is at the dispensing location and obtaining the correct amount of money from a customer who selects that product.

When the price at a display 36 is changed, the amount of money which a customer must pay for the associated product changes. When a customer selects the product, the computer 114 causes the control panel 70 to require the correct amount of money for the product. Thus, when the price display 36 is changed, corresponding changes are made in the amount required at the control panel 70.

Images obtained by activating the imaging devices 100 and 110 (FIG. 4) are identified by comparing the images obtained from the imaging devices with the data base 120. The data base 120 includes an aspect ratio data base 126 which contains data corresponding to the aspect ratio of each of the products 28 (FIG. 2) to be dispensed from the vending machine 10. The aspect ratio of a product is the ratio of the product image height divided by the product image width for a particular product. If desired, the imaging devices 110 may be eliminated. If this is done, other product detection devices may be substituted for the imaging devices 110.

It is contemplated that many different products 28 will be dispensed from the vending machine 10. These products may have different aspect ratios. For example, the aspect ratio of a candy bar will be substantially different than the aspect ratio of a bag containing chips or other articles. Similarly, the aspect ratio of beverage containers will be substantially different than the aspect ration of a bag containing a solid food product. The aspect ratio of an image obtained with an imaging device 100 or 110 is compared to the aspect ratios in the aspect ratio data base 126 (FIG. 4) to assist in identifying the product in the visual image obtained by an imaging device 100 or 110.

A color histogram data base 130 (FIG. 4) contains representations of frequency distributions of colors corresponding to the colors of all the products 28 sold in the vending machine 10. The color histogram for a particular product 28 is obtained by counting the number of pixels of each of a given set of color ranges in two dimensional color space. The color space of the image is partitioned into a number of spaces, for example eight spaces. For each partition, the pixels with a color within the range of the partition are counted. This results in a representation of the relative frequency of the colors of the visual image of a product obtained with an imaging device 100 or 110.

The color histogram for a particular product 28 is a representation of the distribution of colors in an image of the product. The color histogram is derived by counting the number of pixels of each of a given set of color ranges in a color space. The histogram provides a compact summarization of the distribution of data relating to color in an image. The color histogram of an image is relatively invariant with translation and rotation about a viewing axis. By comparing histograms of two images and matching the color content of one image with the other, the color histogram is particularly well suited to the problem of recognizing an object of unknown position and rotation.

In addition to the aspect ratio data base 126 and color histogram data base 130, the data base 120 includes a scale invariant feature data base 132 (FIG. 4). The scale invariant feature data base 132 is a data base of product features which are invariant to image scaling and rotation. In addition, these features are at least partially invariant to changes in illumination and view point of the imaging devices 100 and 110.

In comparing features of an image of a product 28 to the data base 132, the image is matched by comparing each feature from the image to the data base and finding matching features based on Euclidian distance of the feature vectors. The manner in which scale invariant features are utilized in the data base 132 is similar to the description in U.S. Pat. No. 6,711,293 to David G. Lowe and entitled Method and Apparatus for Identifying Scale Invariant Features in an Image and Use of Same for Locating an Object in an Image. The disclosure in the aforementioned U.S. Pat. No. 6,711,293 is hereby incorporated herein in its entirety by this reference thereto.

It should be understood that the data base 120 may identify products by comparing features other than aspect ratio, color and scale invariant features. For example, a bar code or other encoded data on a product 28 may be used alone or in combination with various features of a product to identify the product. It is contemplated that various combinations of encoded data, pixel data, metadata and other data may be utilized to identify the products.

In addition to the data base 120, the controls 106 include a transmitter 136 which is operable to transmit a signal, indicated schematically at 138 in FIG. 4, to a base station which is remote from the vending machine 10. The signal 138 transmits to the base station the identity and number of products sold. In addition, the signal 138 may indicate the total amount of money which was collected from customers making the sales. Alternatively, the signal 38 may transmit the identity and number products sold.

The base station would be able to determine the amount of money collected from customers as a function of the known price of the various products. Thus, the signal 138 may indicate the number of each of the products sold and the cost of each of those products. The base station may be in a building and/or vehicle.

Based on the information which is transmitted from the vending machine 10 by the transmitter 136, the number of each product sold can be determined. To facilitate restocking, this information is utilized to prepare a kit or group of products containing numbers of each product corresponding to the number of each product which were sold from the vending machine 10. When the vending machine 10 is to be restocked, this kit or group of products is taken to the vending machine and is utilized to replace the products that were previously sold from the vending machine. In addition, the amount of money to be collected from the vending machine 10 during restocking can be determined from the information provided by the signal 138.

If desired, DEX (Data Exchange Uniform Code Standard) may be utilized with the controls 106. The transmitter 136 would transmit data in regard to the identity and number of each product 28 sold, the amount of money collected, the service history of the vending machine 10, and other information. In addition, the data transmitted by the transmitter 136 would indicate products 28 which are not selling well. Associated software may suggest that if one particular product 28 is selling well that another product, if stocked in the vending machine 10, will sell well.

Operation

When the vending machine 10 (FIG. 1) has been in use for a period of time, it is contemplated that the vending machine will have to be restocked with products 28 (FIG. 2) to be sold from the vending machine. When this is to be done, data transmitted from the vending machine 10 by the transmitter 136 (FIG. 4) to a base location will be reviewed. When this is done, the identity and number of each of the products which have been sold from the vending machine are determined. The data transmitted from the vending machine 10 eliminates the need to rely upon restocking data which is of questionable validity. The base location may be a warehouse and/or vehicle (truck).

A kit or box of products corresponding to the identity and number of products which have been sold from the vending machine 10 will then be prepared. The number of each of the various products 28 sold from the vending machine 10 is determined and a similar number of each of the various products is placed in the box or kit. This will enable a person who is restocking the vending machine 10 to replace each product which has been sold from the vending machine without transporting excess products.

When the vending machine 10 is to be restocked, a combination door handle and lock 144 (FIG. 1) is actuated and the door 16 is pivoted to an open condition. When the door 16 has been opened, access is provided to the product dispensing devices 24. The person restocking the product dispensing devices 24 can readily position products 28 from the kit or box of products in empty storage locations 52 in the product dispensing devices.

It is contemplated that most of the product dispensing devices 24 will contain only one specific product 28. However, if desired, a variety of products may be provided in one of the product dispensing devices 24. These variety of products may have a variety of different prices.

Thus, bags of chips selling for seventy-five cents, bags of candy selling for eighty-five cents, and bags of other articles selling for one dollar may all be positioned in storage locations 52 in a single product dispensing device 24. During restocking of the vending machine 10, a product may inadvertently be placed in one product dispensing device 24 when it should have been positioned in a different product dispensing device. The controls 106 (FIG. 4) will identify each of the products 28 to be dispensed. The controls 106 will effect any necessary changes in the price display 36 (FIG. 2) associated with a product 28 at a dispensing location 54 to indicate the correct price for the product.

Once the product dispensing devices 24 have been restocked, that is, have been filled with products to be sold, the door 16 is moved from the open position to a closed position. As the door 16 is closed, a switch 148 (FIG. 3) is actuated. Actuation of the switch 148 indicates to the computer 114 (FIG. 4) that the door has been closed and restocking of the vending machine completed.

The switch 148 (FIG. 3) may be connected to the main power supply for the vending machine. When the door 16 is opened, the switch 148 opens and interrupts the power supply. When the door 16 is closed, the switch 148 closes and reconnects the power supply. Alternatively, the switch 148 may be connected with just the computer 114 and not the main power supply. A suitable sensor, to detect opening and closing of the door 16 may be utilized in place of the switch 148. Alternatively, a button or switch may be manually actuated after the door 16 is closed.

When the door closes, the computer 114 (FIG. 4), initiates operation of the imaging devices 100 to obtain images of the products at the dispensing locations 54 in all of the product dispensing devices 24. The imaging devices 100 convert the visual (optical) images of the products 28 at the product dispensing locations 54 in the product dispensing devices 24 to electrical signals. These electrical signals are representative of the images of the products 28.

The electrical signals are transmitted from all of the imaging devices 100 to the computer 114 (FIG. 4). The computer 114 initiates comparison of features of the images represented by the electrical signals with data in the data base 120. This comparison enables the computer 114 to determine the identity of each of the products 28 at each of the product dispensing locations 54 in the product dispensing devices 24.

To identify a product 28 at a dispensing location 54, the aspect ratio of the image of the product to be identified is compared to aspect ratios in the aspect ratio data base 126. The image of the product 28 to be identified is compared to the color histograms in the color histogram data base 130 for images having aspect ratios corresponding to the aspect ratios associated with the images of the product 28 to be identified. The scale invariant features of the image are compared to the scale invariant feature data base 132 for images having aspect ratios and color histograms corresponding to scale invariant feature data in the data base 132. It should be understood that the image of a product may be compared to the data bases 126, 130 and 132 in any desired order.

The identity of each of the products 28 at each of the product dispensing locations 54 is determined in this manner.

Once the identity of each of the products at each of the product dispensing locations 54 has been determined, the price of each product is determined from the product price data base 122. If the display 36 for a particular product is not in agreement with the product price for the product which was identified as being present at the product dispensing location 54, the price display 36 is changed to indicate the correct product price.

Once the foregoing initialization of the vending machine 10 has been accomplished by identifying the next product 28 to be dispensed from each of the product dispensing locations 54 in each of the product dispensing devices 24 and after the price displays 36 have been set to the correct amounts, the vending machine 10 is ready to serve customers. When a customer approaches the vending machine 10, the products 28 at the product dispensing locations 54 (FIG. 2) in the product dispensing devices 24 are illuminated by a cabinet light assembly 152 (FIG. 3). The customer views the products 28 and the price displays 36 through the transparent window 20 in the door 16 of the vending machine 10.

The cabinet light assembly 152 may have any desired construction. The cabinet light assembly 132 may have a vertical axis. The cabinet light assembly 132 may be mounted on the side walls 14 of the housing 12.

After a customer has selected a particular product, he inserts money to pay for the product into the control panel 70 (FIGS. 1 and 4). Paper money is inserted at the bill validation insert 74. Coins are inserted at the coin insert 76. A location maybe provided for insertion of a credit/debit card. The customer is informed as to the amount of money which he has deposited into the vending machine by indicia at the credit display window 82 on the control panel 70.

Once the customer has deposited the requisite amount of money into the vending machine 10, the customer manually actuates the selector switch keyboard 84 on the control panel 70. The customer actuates keys on the selector switch keyboard 84 to enter indicia indicative of the indicia 32 indicating the location of the selected product dispensing device 24. The location of the product dispensing device 24 selected by a customer is transmitted from the selector switch keyboard 84 to the computer 114.

At this time, the display 88 may set forth indicia indicative of characteristics of the selected product. For example, the display 88 may indicate the number of calories, other food value information, and/or ingredients of the selected product. In addition, the display 88 may indicate the brand name of the product and/or special offers or promotions. Of course, if the selected product 28 is not food, the indicia at the display would indicate the identity of the selected product and features of the product, such as for a booklet, the title and number of pages.

Once the keyboard 84 has been actuated to enter indicia corresponding to the indicia 32 indicating the location of the selected product 28, the computer 114 (FIG. 4) effects operation of one or more motors 156 in the product dispensing device 24 at the selected product location indicated by the indicia 32 entered into the keyboard 84 of the control panel 70. The motor 156 effects rotation of the helical conveyor elements 42 and 44 in the selected product dispensing device 24. As was previously mentioned, the dispensing devices 24 may have a different construction if desired. It is contemplated that the dispensing devices 24 may have any one of many known constructions.

The helical conveyor elements 42 and 44 are rotated in opposite directions about their longitudinal central axes. Thus, the helical conveyor element 42 is rotated in a counterclockwise direction (as viewed in FIG. 2) about its longitudinal central axis while the helical conveyor element 44 is rotated in a clockwise direction about its longitudinal central axis. Although a single motor 156 has been shown in FIG. 4 as being connected with two helical conveyor elements 42 and 44, a separate motor may be provided for each of the conveyor elements. Of course, one or more of the dispensing devices 24 may have only a single helical conveyor element.

Rotation of the helical conveyor elements 42 and 44 by a motor 156 (FIG. 4) moves the product 28 at the selected product dispensing location 54 off of the tray 48 (FIG. 2). The selected product 28 then drops downward from the product dispensing device 24 to the product retrieval location 60 (FIG. 1). At the same time, rotation of the helical conveyor elements 42 and 44 (FIG. 2) advance the next succeeding product 28 from a storage location to the product dispensing location 54. Similarly, the other products 28 disposed in storage locations 52 in the selected product dispensing device 24 are advanced toward the product dispensing location 54 by the rotation of the helical conveyor elements 42 and 44.

As the selected product 28 falls downward to the product retrieval location 60, the imaging device 110 (FIG. 4) is activated to obtain a visual image of the dispensed product. The imaging device 110 converts the optical image of the dispensed product to an electrical signal which is transmitted to the computer 114. The electrical signal transmitted from the imaging device 110 to the computer 114 confirms dispensing of a product.

The foregoing description has been in association with dispensing devices 24 having helical conveyor elements 42 and 44. It is contemplated that the dispensing devices 24 will have a construction which is adapted to handling of the particular product 28 to be dispensed. For example, a dispensing device 24 to be used in association with containers of liquid would have a construction which is different than a dispensing device to be used in association with bags of chips or candy.

The comparator 116 compares features of the image of the dispensed product to the data base 120 to determine the identity of the dispensed product. This enables the computer 114 to confirm that the selected product was indeed dispensed from a product dispensing device 24 to the product retrieval location 60. However, if the image of the dispensed product obtained by operation of the imaging device 110 is inadequate to enable the comparator 116 and computer 114 to determine the identity of the dispensed product, the image will at least confirm that a product was dispensed.

In the unlikely event that the imaging device 110 does not obtain an image of a dispensed product 28, the computer 114 (FIG. 4) receives an indication of malfunctioning of the selected product dispensing device 24. The computer 114 then effects operation of the selected motor 156 with a jogging or intermittent operation in a further effort to dispense the selected product 28. If this intermittent operation of the motor 156 is successful, the intermittent or jogging operation of the motor 156 is interrupted when the imaging device 110 successfully obtains a visual image of the selected product 28 at or moving toward the product retrieval location 60.

If the intermittent or jogging operation of the motor 156 is ineffective to cause the product dispensing device 24 to dispense the selected product 28, the computer 114 changes the display window 88 to indicate to the customer that another selection is to be made. The computer 114 gives the customer credit for the money that has already deposited in the vending machine 10 and allows the customer to make a selection of a product 28 of equal or lesser cost. Of course, if the product of lesser cost is selected, the computer 114 effects operation of the vending machine 10 to refund the excess amount of money which the customer deposited. Alternatively, the computer 114 could immediately give the customer a refund if a product is not dispensed.

The computer 114 periodically activates the transmitter 136 to transmit a signal 138 (FIG. 4) to a base or remote location. The signal 138 indicates the identity of the products which have dispensed and indicates the prices of the products. This enables personnel at the base or remote location to determine how much money has been deposited in the vending machine and to determine what products need to be brought to the vending machine in order to restock the vending machine. The transmitter 136 may be of either the radio or telephone type. Of course, other types of transmitters may be utilized if desired. If desired, the computer 114 could activate the transmitter 136 to transmit data in response to a signal from a base station.

During operation of the motor 156 to rotate the helical conveyor elements 42 and 44 in the selected product dispensing device 24, the first product 28 (FIG. 2) is dispensed from the product dispensing location 54 and a second product moves from a storage location 52 to the dispensing location (FIG. 2). The second product 28 which is moved from a storage location 52 to the dispensing location 54 may or may not be the same as the product 28 which was previously at the dispensing location and was selected by a customer.

After a second product has been moved from a storage location 52 to a product dispensing location 54, one of the imaging devices 100 is activated by the computer 114 to obtain a visual image of the second product 28 at the dispensing location 54. The computer 114 activates only the imaging device 100 which is positioned to obtain a visual (optical) image of the product 28 at the dispensing location 54 from which a selected product was previously dispensed. Since a product 28 was dispensed from only one of the product dispensing locations 54, the computer 114 maintains the imaging devices 100 associated with other product dispensing locations inactive.

The imaging device 100 which is activated to obtain a visual image of the second product 28 at the product dispensing location 54 converts the optical image to an electrical signal. This electrical signal is transmitted to the computer 114. The computer 114 effects operation of the comparator 116 to compare features of the visual image of the second product to features in the data base 120 to determine the identity of the second product.

The identity of the second product 28 at the product dispensing location 54 may be the same as the identity of the product which was previously dispensed from the product dispensing location 54. However, it is contemplated that the identity of the second product 28 which replaces the previously dispensed product may be different than the identity of the previously dispensed product. If this is the case, the computer may effect an increase or decrease in the price display 36 associated with the product dispensing device 24 in which the second product was moved to the product dispensing location 54 to replace a previously dispensed product. The price display 36 associated with this product dispensing device 24 is changed to indicate the price of the product which is presently at the product dispensing location 54, that is, the price of the second product.

It is possible that a dispensing device 24 may fail to move a product 28 from a storage location 52 to a product dispensing location 54 after a product is dispensed. In the unlikely went that this occurs, activation of an imaging device 100 to obtain a visual image of the product dispensing location 54 from which a product was dispensed will result in an image of an empty dispensing location. When the image of an empty product dispensing location 54 is compared to the data base 120 by the comparator 116, the result is a signal to the computer 114 indicating the empty dispensing location. In response to this signal, the computer 114 will effect operation the one dispensing device 24 having an empty product dispensing location 54. This operation of the dispensing device will move a product 28 from a storage location 52 to the empty product dispensing location 54.

Since the product which is moved from a storage location 52 to a product dispensing location 54 in a product dispensing device 24 is identified each time a product is dispensed from the product dispensing device, different products can be sequentially dispensed from a single product dispensing device 24. The price display 36 is adjusted to accommodate the different prices of different products. This enables different products to either be intentionally or inadvertently positioned in a single product dispensing device 24 during restocking of the vending machine 10.

Images

It is contemplated that an imaging device 100 may be provided for each of the product dispensing devices 24 in the vending machine 10. The specific vending machine 10 illustrated in FIG. 1 has twenty-four dispensing devices 24. Thus, twenty-four imaging devices 100 may be provided for the vending machine 10. Of course, the vending machine 10 may be provided with either a greater or lesser number of product dispensing devices 24 and either a greater or lesser number of imaging devices 100.

Rather than providing one imaging device 100 for each product dispensing device 24, it is contemplated that it may be desirable to have each imaging device associated with a plurality of product dispensing devices. If each imaging device 100 is associated with a plurality of product dispensing devices 24, the number of imaging devices required for a particular vending machine 10 is reduced. Of course, this simplifies construction or retrofitting of the vending machine 10.

In the vending machine 10 illustrated schematically in FIG. 1, two product dispensing devices 24 are associated with each imaging device 100. When one of the imaging devices 100 is activated to obtain a visual (optical) image, the image will be of two product dispensing devices 24. These two product dispensing devices 24 will have two product dispensing locations 54 in which products 28 are disposed. This results in the image obtained from one of the imaging devices 100 being similar to the illustration depicted in FIG. 2.

The half of the image corresponding to the product dispensing device 24 from which a product was just dispensed is designated by the computer 114 as being an area of interest. Thus, if a product was dispensed from location A1 of FIG. 2, the left (as viewed in FIG. 2) half of the image obtained by activation of the imaging device 100 associated with the two product dispensing devices 24 illustrated in FIG. 2 would be of interest. Similarly, if the product had been dispensed from the location designated A2 by the indicia 32 in FIG. 2, the right (as viewed in FIG. 2) half of the image would be designated by the computer 114 as being the area of interest.

Rather than comparing the images of both the location indicated by the indicia A1 and the location indicated by A2 with the data base 120, only the image in the area of interest is compared with the data base 120. Thus, if the product which was dispensed came from the product dispensing location designated A1 by the indicia 32, only the left (as viewed in FIG. 2) half of the image would be designated as being of interest and would be compared to the data base 120. Similarly, if the product which was dispensed came from the product dispensing location designated A2 by the indicia 32, only the right half of the image would be designated as being of interest and would be compared to the data base 120.

Since two product dispensing devices 24 are viewed by each imaging device 100, there are half as many imaging devices 100 as there are product dispensing devices 24. In the specific vending machine 10 illustrated in FIG. 1, there are twenty-four product dispensing devices 24 and twelve imaging devices 100. Of course, a greater or lesser number of product dispensing devices 24 may be provided in association with a particular vending machine 10. In addition, a greater or lesser number of imaging devices 100 may be associated with a particular vending machine 10.

If desired, the imaging devices 100 may be constructed and positioned so as to view more than two product dispensing devices 24. Thus, a single imaging device 100 may be constructed and positioned so as to view three or more product dispensing devices 24. It is contemplated that an imaging device 100 may be constructed so as to view ten dispensing devices 24. This would enable a vending machine 10 having forty dispensing devices 24 to use only four imaging devices 100.

In the embodiment of the invention illustrated in FIGS. 1-4, the imaging devices 100 are positioned so that they view product dispensing devices 24 disposed on a single tray 48, that is, product dispensing devices 24 at the same vertical level. However, it is contemplated that the imaging devices 100 may be constructed and positioned so as to view product dispensing devices 24 on more than one tray 48. Thus, the product imaging devices 100 may be constructed and positioned so as to view two dispensing devices 24 on each of two trays. In this specific example, the imaging devices may be positioned so as to view product dispensing devices designated A1 and A2 (FIG. 2) and B1 and B2 (FIG. 1) disposed immediately beneath the product dispensing devices designated A1 and A2.

It is contemplated that each dispensing device 24 may be viewed by more than one imaging device. For example, each dispensing device 24 may be viewed by two imaging devices mounted at spaced apart locations in the vending machine 10. This would enable the comparator 116 to compare two different images of a product 28 at one dispensing location 54 to the data base 120 to identify the product at the dispensing location.

Mounting an Imaging Device

In the specific embodiment of the invention illustrated in FIGS. 1-4, the imaging devices 100 are mounted in a stationary relationship with the product dispensing devices, as long as the door 16 is closed. Thus, the imaging devices 100 are mounted on the inner side surface 106 (FIG. 3) of the transparent window 20 in the door 16. In this embodiment of the invention, the imaging devices 100 are fixedly secured to the inner side surface 106 of the window 20. This may be done with a suitable adhesive or other fastener.

It should be understood that the imaging devices 100 may be mounted in a different manner if desired. For example, the window 20 may be provided with mullions and/or muntins on which the imaging devices 100 are mounted. Alternatively, some or all of the imaging devices 100 may be mounted on the frame of the door 16 or on side walls of the housing 12.

Figure 5:
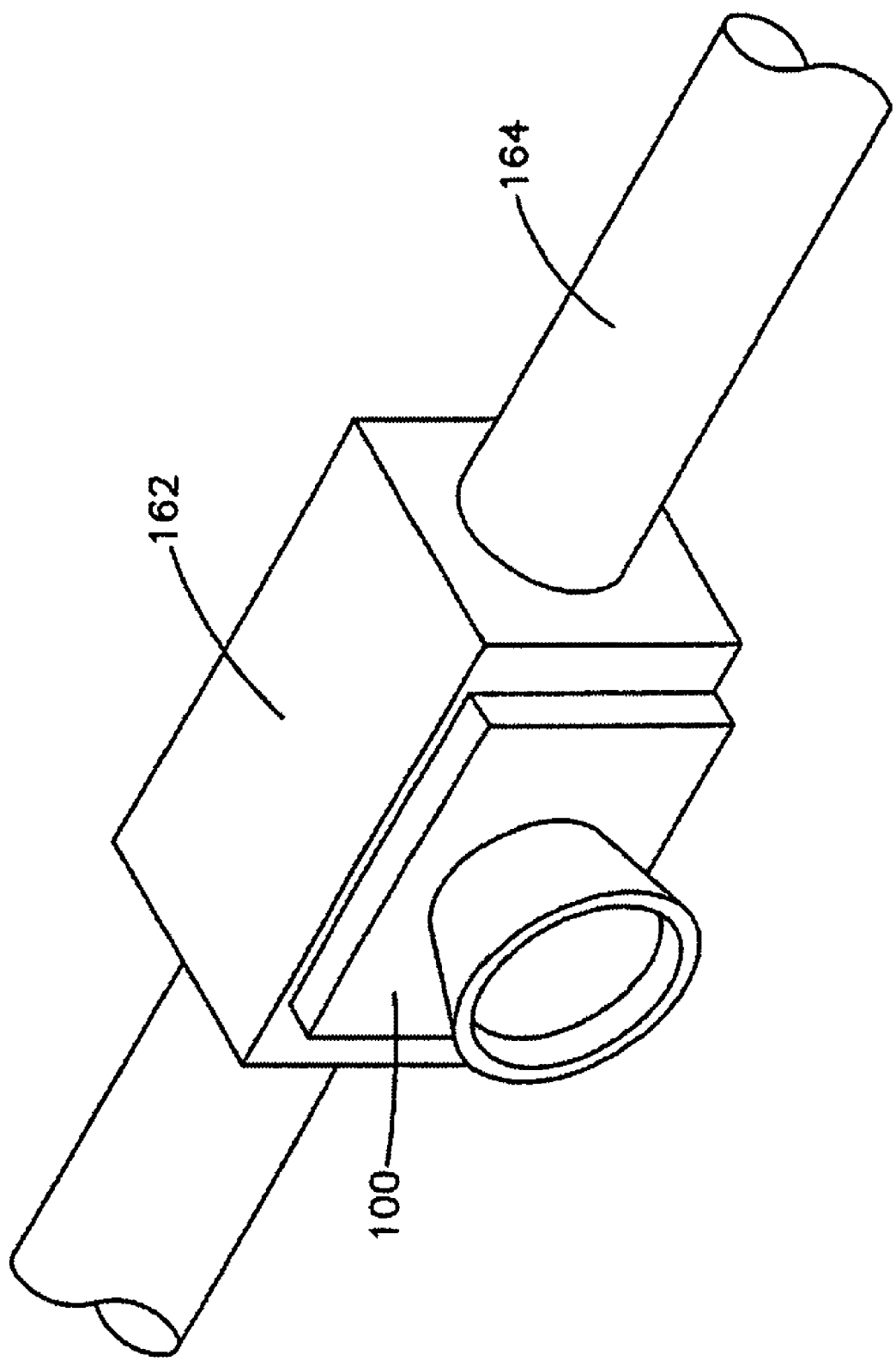
FIG. 5 is a fragmentary schematic illustration depicting the manner in which an imaging device may be mounted on a movable carriage in the vending machine of FIG. 1.

In the embodiment of the invention illustrated in FIG. 5, an imaging device 100 is mounted on a carriage 162 which is movable along a track 164. A drive mechanism, such as a screw or gear drive, may be associated with the carriage 162 to move it along the track 164. It is contemplated that the track 164 may be mounted on the window 20. Alternatively, the track 164 may be offset to one side of the window 20 on the door 16. If desired, the track 164 may be mounted on the side walls 14 of the housing 12.

In the embodiment of the invention illustrated in FIG. 5, the track 164 is stationary relative to the housing 12. However, it is contemplated that the track may be movable relative to the housing. For example, one end of the track 164 may be mounted for pivotal movement relative to the housing 12. Alternatively, the track 164 may be mounted for linear movement relative to the housing 12.

CONCLUSION

In view of the foregoing description it is apparent that the present invention provides a new and improved vending machine 10 having a plurality of product dispensing devices 24. Each of the product dispensing devices 24 holds a next product 28 to be dispensed from the dispensing device and a plurality of products which are located at product storage locations 52 in the product dispensing device 24. The products 28 at the storage locations 52 are sequentially moved to the product dispensing location 54.

In accordance with one of the features of the present invention, a visual image of the next product 28 to be dispensed at the product dispensing location 54 in each of the product dispensing devices 24 is obtained. Features of the visual image of the next product 28 to be dispensed from each of the product dispensing locations 54 are compared to a data base 120 of features to determine the identity of the next product to be dispensed from each of the dispensing devices 24. Thereafter, the next product 28 to be dispensed is moved from one of the dispensing devices 24 to a product retrieval location 60 for a customer who selected the product.

When a first product 28 is moved from a dispensing location 54 in one of the product dispensing devices 24, a second product is moved from a storage location 52 to the dispensing location. In accordance with another feature of the present invention, a visual image is obtained of the second product 28 at the dispensing location 54 in the one product dispensing device 24. Features of the visual image of the second product 28 are compared to the data base 120 of features to determine the identity of the second product.

In accordance with another feature of the present invention, prices of products 28 at the dispensing locations 54 are determined by comparing features of visual images of the products to the data base 120 of features. Once the identity of the product 28 has been determined, prices on displays 36 associated with the products 28 are compared with prices for the products at the dispensing locations 54. Any disagreement between the displayed price and the price as determined by the data base 120 is corrected.

In accordance with another feature of the present invention, data representative of the identity of the products dispensed from the vending machine 10 is transmitted to a location which is spaced from a vending machine. A group of products 28, corresponding to products which the transmitted data indicates were dispensed from the vending machine 10, is formed. This group of products 28 is transported to the vending machine 10 to facilitate restocking of the vending machine. In addition, the data which is transmitted from the vending machine 10 indicates the amount of money which was deposited in the vending machine to facilitate the accounting for the money.

The present invention has a number of different features. These features may be utilized together as disclosed herein. These features may be utilized separately and/or in various combinations with each other or the prior art.

Having described the invention, the following is claimed:

1. A method comprising the steps of:
   providing a vending machine having a plurality of product dispensing devices, each of the product dispensing devices has a product dispensing location which holds the next product to be dispensed from the product dispensing device and a plurality of product storage locations which hold products to be sequentially moved to the product dispensing location after the next product to be dispensed is moved from the product dispensing location,
   positioning products in the product dispensing locations and in the product storage locations, thereafter,
   operating a plurality of imaging devices disposed in the vending machine to obtain visual images of the next products to be dispensed from each of the product dispensing locations in the product dispensing devices,
   comparing features of the visual images of each of the next products to be dispensed from the dispensing locations in the product dispensing devices to a data base of features to determine the identity of the next product to be dispensed from each of the dispensing devices, thereafter,
   moving the next product to be dispensed from the product dispensing location in one of the product dispensing devices to a product retrieval location where a customer has access to the product,
   moving a second product from a storage location in the one product dispensing device to the product dispensing location in the one product dispensing device,
   operating one imaging device of the plurality of imaging devices to obtain a visual image of the second product at the dispensing location in the one dispensing device, and
   comparing features of the visual image of the second product to the data base of features to determine the identity of the second product.

2. A method as set forth in claim 1 further including the steps of determining prices for products to be dispensed from the dispensing devices based on the identity of the products as determined by performing said step of comparing features of visual images of the products to the data base of features, comparing prices on a plurality of displays with prices which were determined by said step of determining prices, and changing any prices on the displays which do not agree with the prices which were determined by said step of determining prices.

3. A method as set forth in claim 1 wherein said step of obtaining a visual images of the next products to be dispensed from each of the product dispensing locations in the dispensing devices includes obtaining a single visual image containing images of the next products to be dispensed at the dispensing locations in a plurality of dispensing devices, said step of comparing features of the visual images of each of the next products to be dispensed from the dispensing locations in the product dispensing devices to a data base of features includes selecting the image of a single product from the images of a plurality of products contained in a single visual image and comparing features of the selected image of a single product to the data base of features.

4. A method as set forth in claim 1 wherein said step of obtaining a visual image of the second product at the dispensing location in the one dispensing device includes obtaining a single visual image containing images of the next product to be dispensed at the dispensing locations in a plurality of dispensing devices, said step of comparing features of the visual image of the second product to the data base of features includes selecting the image of a single product from the images of a plurality of products contained in a single visual image and comparing features of the selected image of a single product to the data base of features.

5. A method as set forth in claim 1 wherein said step of obtaining a visual image of the next product to be dispensed from each of the product dispensing locations in the product dispensing devices includes operating a plurality of imaging devices mounted on a door of the vending machine.

6. A method as set forth in claim 1 wherein said step of obtaining a visual image of the second product at the dispensing location in the one dispensing device includes operating an imaging device mounted on a door of the vending machine.

7. A method as set forth in claim 1 wherein said step of obtaining visual images of the next products to be dispensed from each of the product dispensing locations in the product dispensing devices is initiated in response to closing of a door of the vending machine.

8. A method as set forth in claim 1 wherein said step of obtaining visual images of the next products to be dispensed from each of the product dispensing locations in the product dispensing devices is initiated in response to supplying of electrical power to the vending machine.

9. A method as set forth in claim 1 wherein the data base of features includes data corresponding to an aspect ratio of products in the vending machine, said step of comparing features of the visual images of the next products to be dispensed from the dispensing locations in the product dispensing devices to a data base of features to determine the identity of the next product to be dispensed from each of the dispensing devices includes determining the aspect ratios of the visual images of the next products to be dispensed from the dispensing locations in the product dispensing devices and comparing the aspect ratios of the visual images of the next products to be dispensed from the dispensing locations in the product dispensing devices to data corresponding to the aspect ratios of each of the products in the vending machine.

10. A method as set forth in claim 1 wherein the data base of features includes data corresponding to a color histogram of each of the products in the vending machine, said step of comparing features of the visual images of the next products to be dispensed from the dispensing locations in the product dispensing devices to a data base of features to determine the identity of the next product to be dispensed from each of the dispensing devices includes determining color histograms of the visual images of the next products to be dispensed from the dispensing locations in the product dispensing devices and comparing the color histograms of the next products to be dispensed from the dispensing locations in the product dispensing devices to color histograms corresponding to the color histograms of products in the vending machine.

11. A method as set forth in claim 1 wherein the data base of features includes data corresponding to scale invariant features of each of the products in the vending machine, said step of comparing features of the visual images of the next products to be dispensed from the dispensing locations in the product dispensing devices to a data base of features to determine the identity of the next product to be dispensed from each of the dispensing devices includes determining scale invariant features of the visual images of the next products to be dispensed from the dispensing locations in the product dispensing devices and comparing the scale invariant features of the next products to be dispensed from the dispensing locations in the product dispensing devices to scale invariant features corresponding to the scale invariant features of products in the vending machine.

12. A method as set forth in claim 1 wherein said step of moving the next product to be dispensed from one of the dispensing devices to a product retrieval location includes rotating a helical conveyor member.

13. A method as set forth in claim 1 further including the step of transmitting data from the vending machine indicative of the identity of products dispensed from the vending machine to a location spaced from the vending machine.

14. A method as set forth in claim 13 further including the step of collecting money deposited in the vending machine by customers, said step of transmitting data from the vending machine includes transmitting data indicative of the amount of money deposited in the vending machine by customers, and comparing the amount of money collected from the vending machine to data transmitted from the vending machine.

15. A method as set forth in claim 13 further including the steps of preparing a group of products corresponding to products which the transmitted data indicates were dispensed from the vending machine and transporting the group of products to the vending machine to facilitate restocking of the vending machine.

16. A method as set forth in claim 1 wherein the vending machine has a transparent window through which products may be viewed by potential customers, said step of obtaining visual images of the next products to be dispensed from each of the product dispensing locations in the product dispensing devices includes operating a plurality of imaging devices mounted on the window.

17. A method as set forth in claim 1 wherein the vending machine includes a housing, said step of obtaining a visual images of the next products to be dispensed from each of the product dispensing locations in each of the product dispensing devices includes operating a plurality of imaging devices which are mounted on the housing.

18. A method as set forth in claim 1 wherein the vending machine includes a carriage on which an imaging device is mounted, said step of obtaining a visual image of the second product at the dispensing location in the one dispensing device includes moving the carriage relative to the dispensing devices.

19. A method as set forth in claim 1 further including the step of obtaining a visual image of a product after the product has moved from a dispensing device toward a product retrieval location.

20. A method as set forth in claim 1 further including the step of stocking the plurality of product dispensing devices with products to be sold, said step of stocking the plurality of product dispensing devices includes opening the door of the vending machine to obtain access to the product dispensing devices and closing the door of the vending machine to block access to the product dispensing devices after products to be sold have been positioned in the product dispensing devices, said steps of opening and closing the door of the vending machine includes moving the plurality of imaging devices with the door of the vending machine, said step of operating a plurality of imaging devices being initiated in response to closing of the door of the vending machine.

21. A method as set forth in claim 20 further including the step of changing a display indicating the price of a product at a dispensing location as a function of a visual image obtained by effecting operation of an imaging device mounted on the door of the vending machine.

22. A method as set in claim 20 further including the step of transmitting data from the vending machine to a location spaced from the vending machine, said step of transmitting data includes determining data which is to be transmitted as function of visual images obtained by operating at least some of the imaging devices of the plurality of imaging devices and is initiated in response to closing of the door of the vending machine.

23. A method as set forth in claim 1 wherein after a first product has been dispensed from a product dispensing location in a first one of the product dispensing devices, a first imaging device of the plurality of imaging devices is operated to obtain a visual image of a second product to be dispensed from the product dispensing location in the first one of the product dispensing devices, comparing features of the visual image of the second product to be dispensed from the product dispensing location in the first one of the product dispensing devices to the data base of features to determine the identity of the second product to be dispensed from the product dispensing location in the first one of the product dispensing devices, determining a price in a data base of prices for the second product to be dispensed from the product dispensing location in the first one of the product dispensing devices, changing a displayed price for the second product to be dispensed from the product dispensing location in the first one of the product dispensing devices if the displayed price does not agree with the price in the data base of prices for the second product to be dispensed, and, thereafter, moving the second product to be dispensed from the product dispensing location in the first one of the product dispensing devices.

* * * * *